Figure 1:
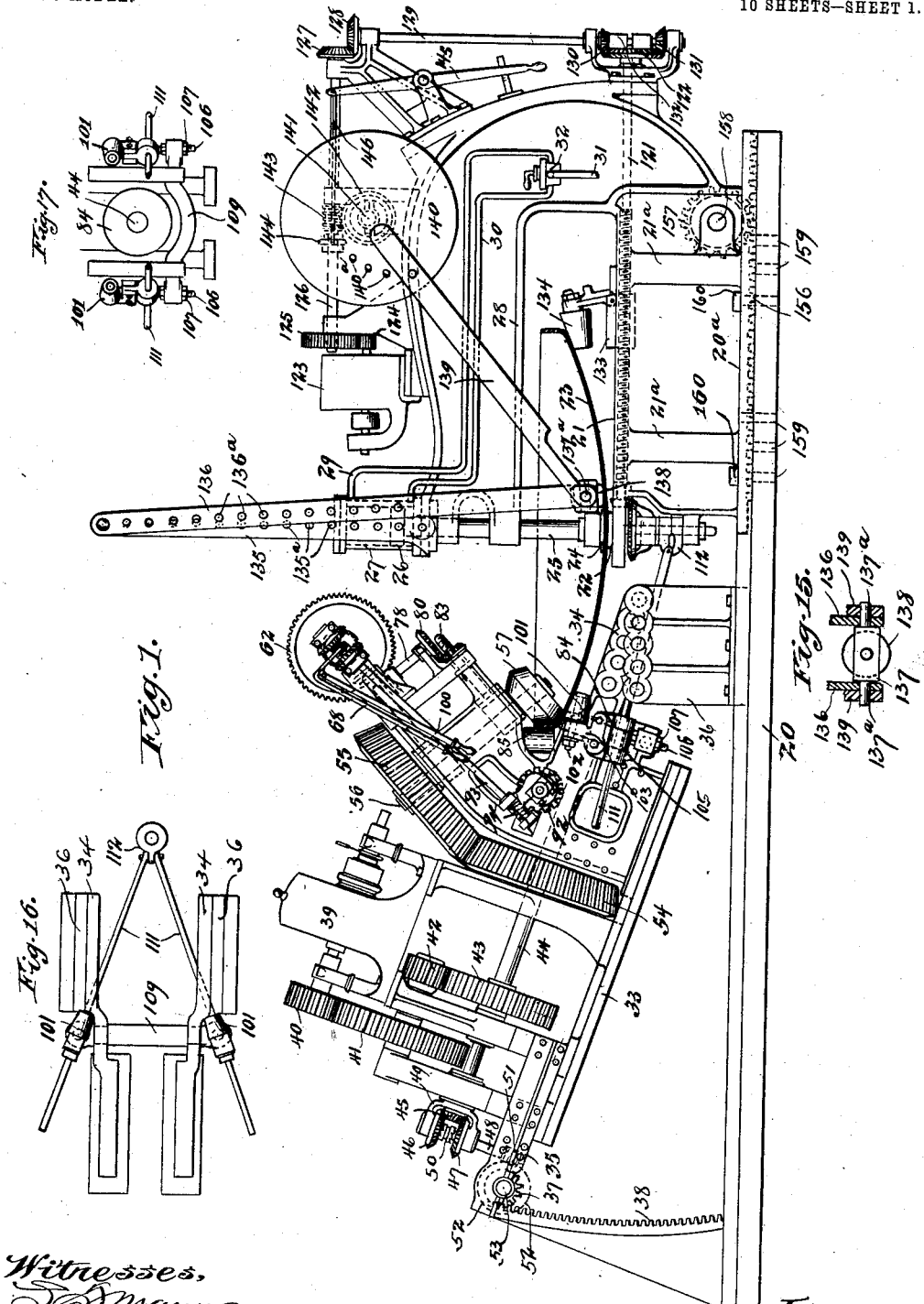

No. 738,428. PATENTED SEPT. 8, 1903.
C. GABRIEL.
DISHING AND FLANGING MACHINE.
APPLICATION FILED APR. 1, 1903.
NO MODEL. 10 SHEETS—SHEET 1.

Witnesses,
F. S. Mann
S. N. Pond

Inventor:
Charles Gabriel,
By Offield, Towle + Linthicum
Attys.

No. 738,428. PATENTED SEPT. 8, 1903.
C. GABRIEL.
DISHING AND FLANGING MACHINE.
APPLICATION FILED APR. 1, 1903.
NO MODEL. 10 SHEETS—SHEET 3.

Witnesses, Inventor,
Charles Gabriel,

No. 738,428. PATENTED SEPT. 8, 1903.
C. GABRIEL.
DISHING AND FLANGING MACHINE.
APPLICATION FILED APR. 1, 1903.
NO MODEL. 10 SHEETS—SHEET 4.

Witnesses,
Inventor,
Charles Gabriel,
By Offield, Towle & Linthicum
Attys.

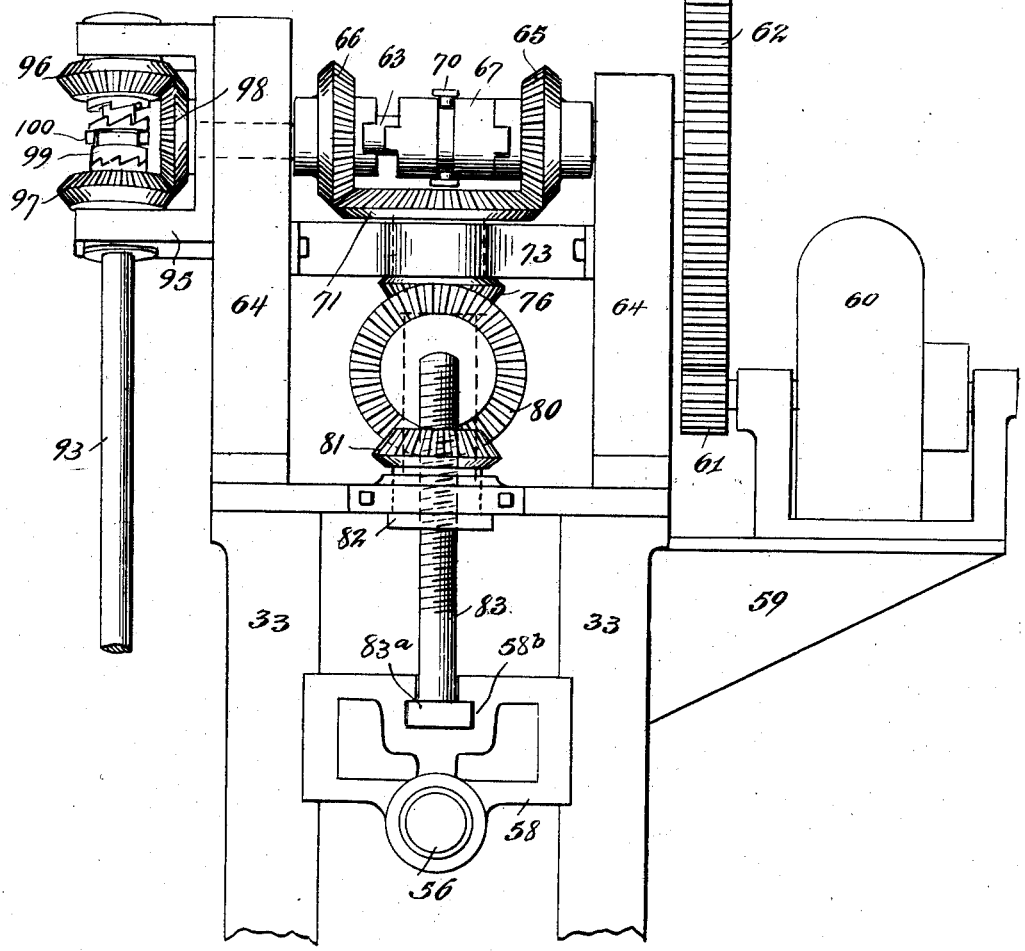
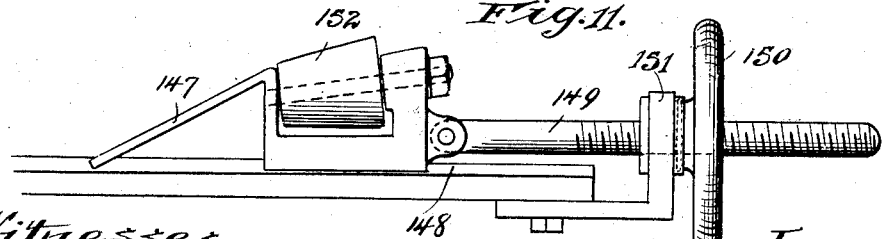

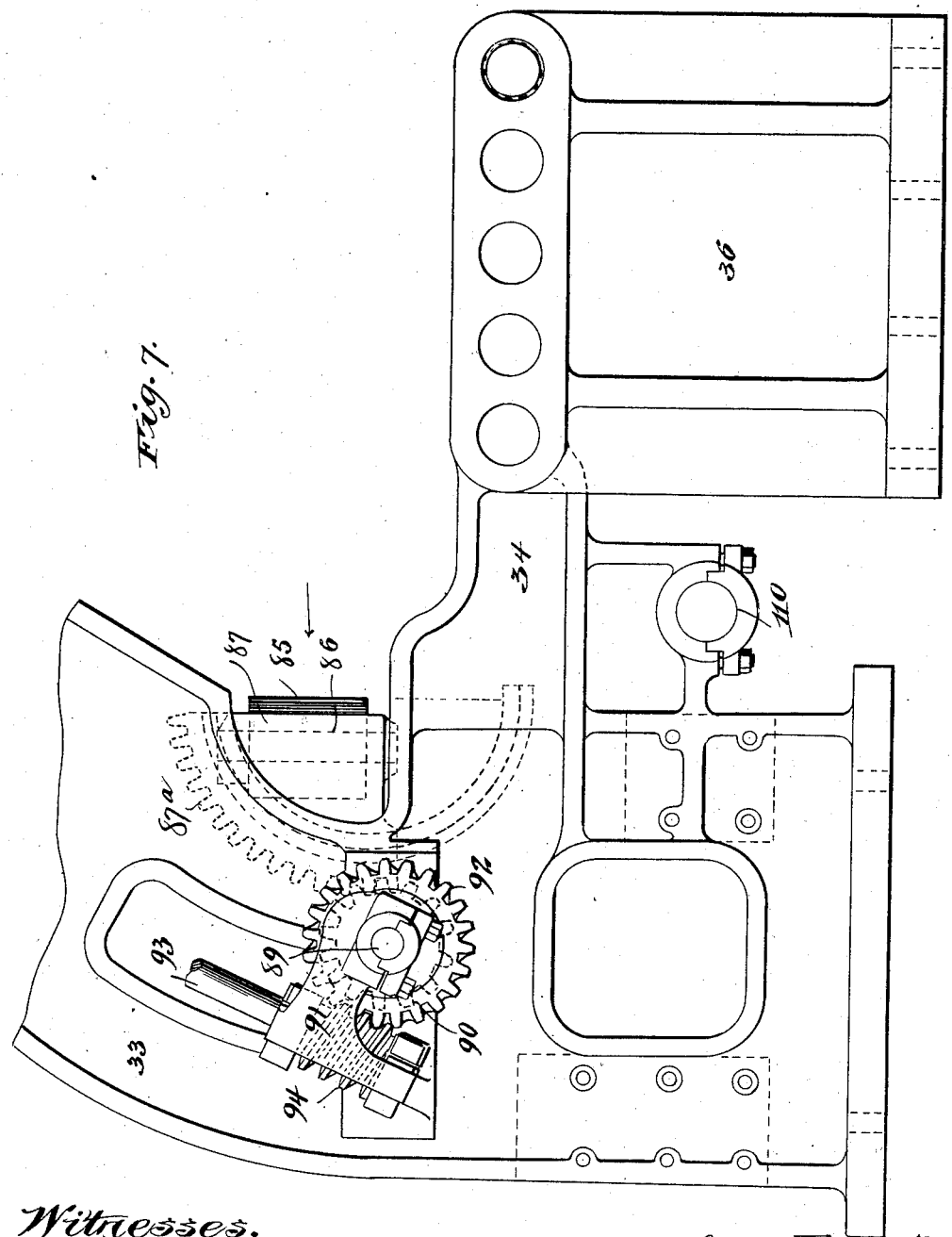

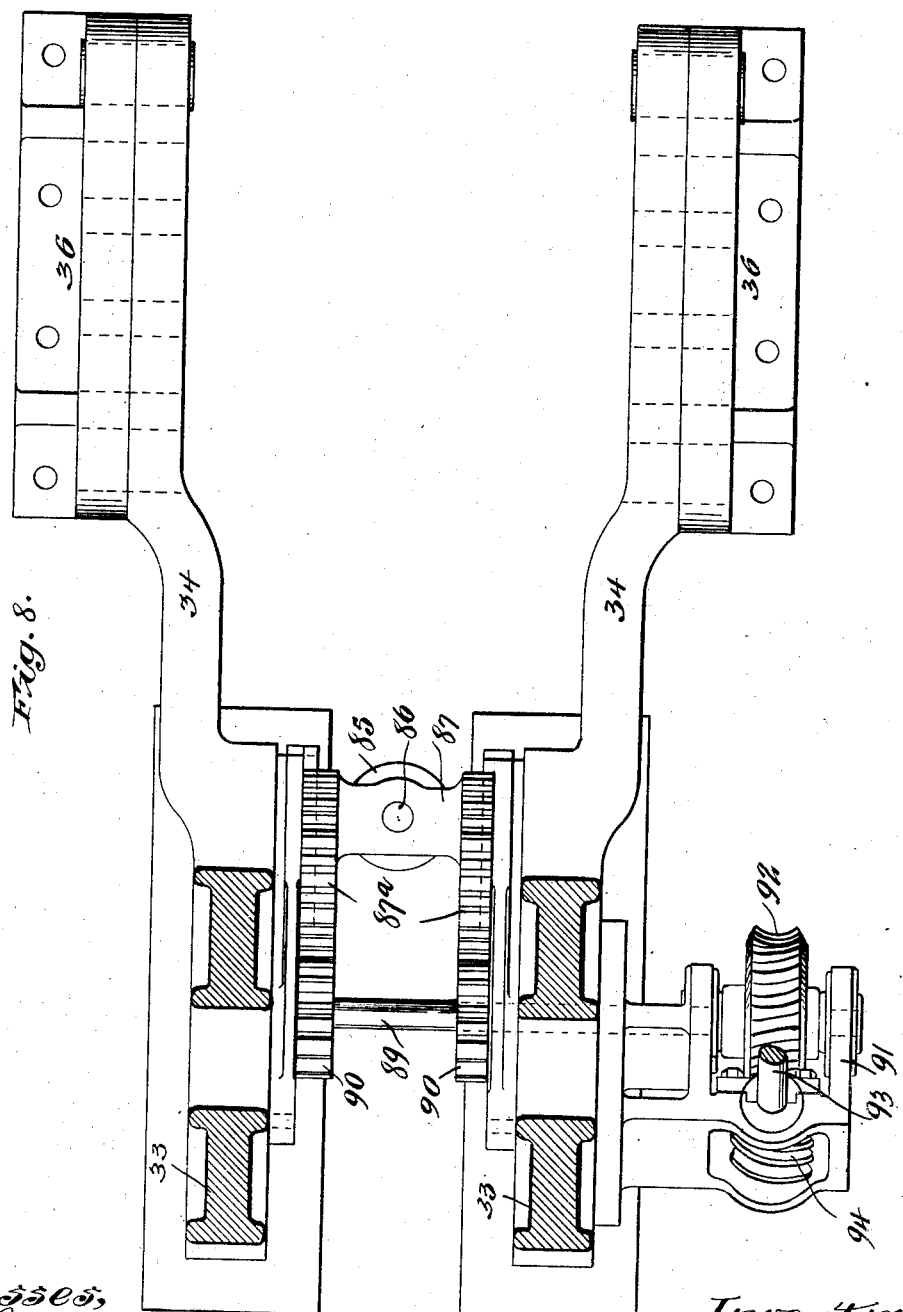

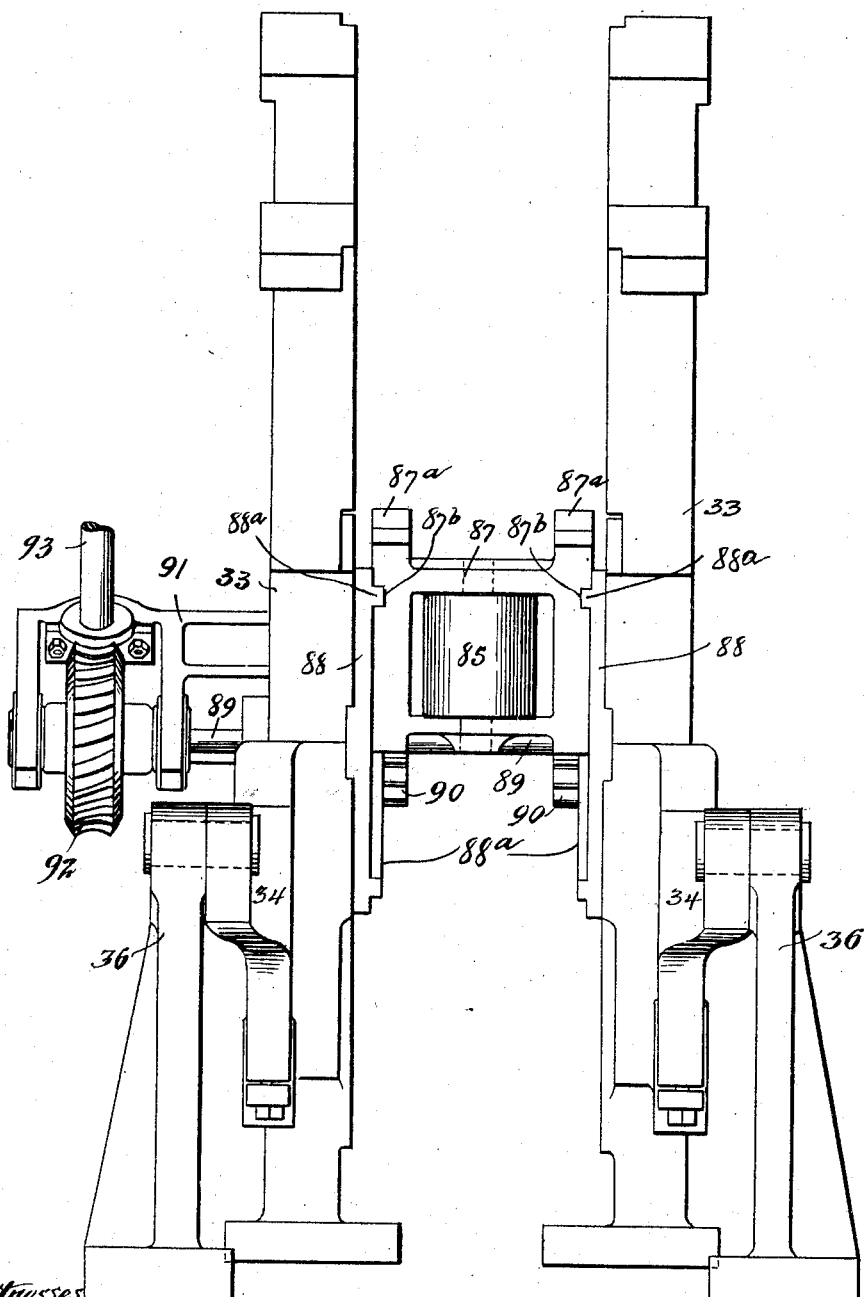

No. 738,428. PATENTED SEPT. 8, 1903.
C. GABRIEL.
DISHING AND FLANGING MACHINE.
APPLICATION FILED APR. 1, 1903.
NO MODEL. 10 SHEETS—SHEET 9.
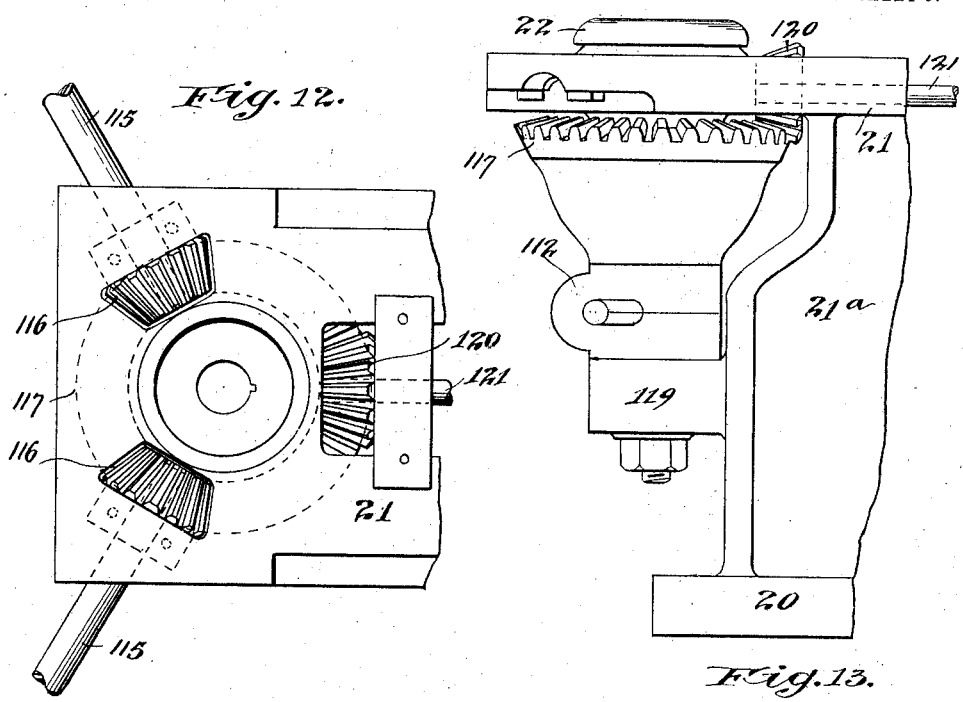
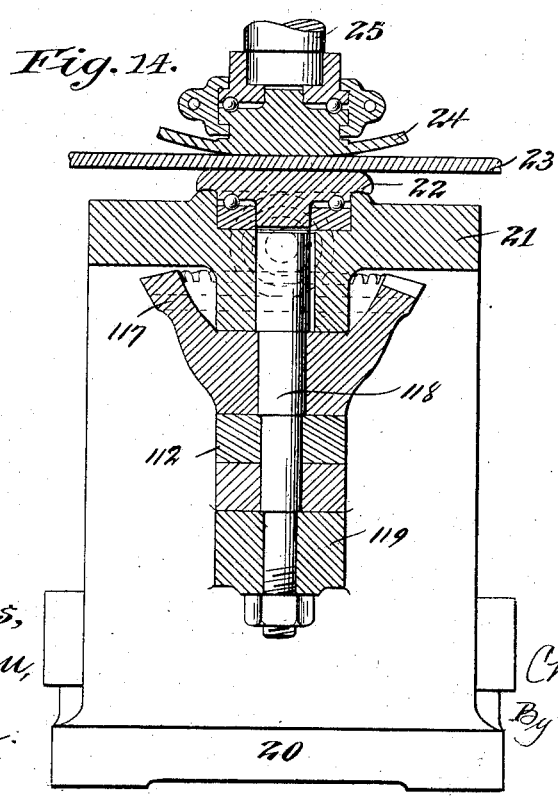

No. 738,428. PATENTED SEPT. 8, 1903.
C. GABRIEL.
DISHING AND FLANGING MACHINE.
APPLICATION FILED APR. 1, 1903.
NO MODEL. 10 SHEETS—SHEET 10.
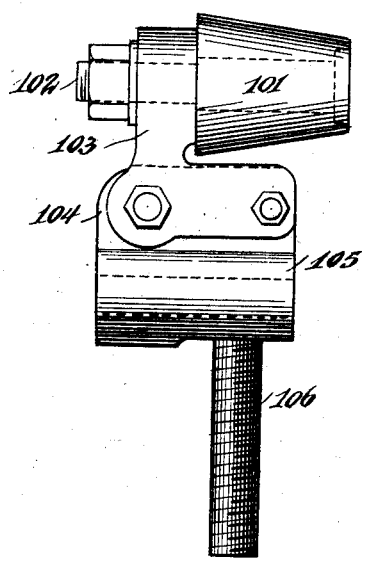
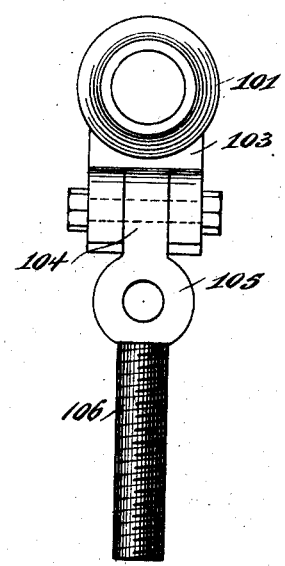
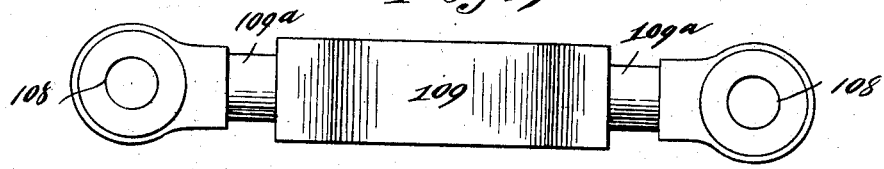
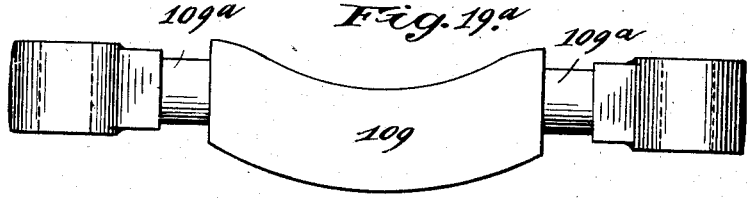
Witnesses,
T. S. Mann,
S. N. Pond.
Inventor,
Charles Gabriel,
By Offield, Towle & Linthicum
Attys.

No. 738,428. Patented September 8, 1903.

UNITED STATES PATENT OFFICE.

CHARLES GABRIEL, OF CHICAGO, ILLINOIS, ASSIGNOR TO JOHN MOHR & SONS, OF CHICAGO, ILLINOIS, A CORPORATION OF ILLINOIS.

DISHING AND FLANGING MACHINE.

SPECIFICATION forming part of Letters Patent No. 738,428, dated September 8, 1903.

Application filed April 1, 1903. Serial No. 150,599. (No model.)

*To all whom it may concern:*

Be it known that I, CHARLES GABRIEL, a citizen of the United States, residing at Chicago, in the county of Cook and State of Illinois, have invented certain new and useful Improvements in Dishing and Flanging Machines, of which the following is a specification.

My invention relates to metal-working machines, and has reference more particularly to a machine designed to form up the heads of boilers, tanks, and the like from circular flat disks of metal by a rolling operation in which the rolls are so disposed and coöperate in such a manner as to effect a flanging or a simultaneous flanging and dishing of the disk or plate subjected to their action.

The common method of producing boiler-heads and like articles which are provided with a circumferential flange and which in addition thereto are frequently outwardly bulged or dished, so as to present a convex exterior, has been to subject the heated disk to the action of a mold and die which presses it into the required shape. This is a comparatively simple and economical mode of producing such articles, but obviously requires a separate mold and die for each different size of head, thus making the total apparatus requisite to the production of a considerable variety of sizes uneconomical in the aggregate.

My invention has for its primary object to replace the use of dies and molds in the manufacture of such articles by a machine which may be gaged and adjusted to the production of heads through a considerable variety of dimensions.

Another object of my invention is to provide a machine for the manufacture of boiler-heads and the like capable of yielding a more perfect product than can be secured by the molding operation and capable of yielding not only a considerable variety in the dimensions of the product, but also a considerable variety in the forms and shapes thereof, my invention being capable of yielding not only a plain flat flanged head, but also a head having varying degrees of convexity.

Other minor objects of the invention will appear later in the subjoined description.

To these ends my invention consists in a novel machine of the character indicated possessing the characteristics of structure and principle of operation substantially as hereinafter described, and more particularly set forth and defined in the claims.

In the accompanying drawings I have illustrated as typical of my invention a complete machine embodying the same in the best mechanical form which I have as yet devised, and wherein—

Figure 2:
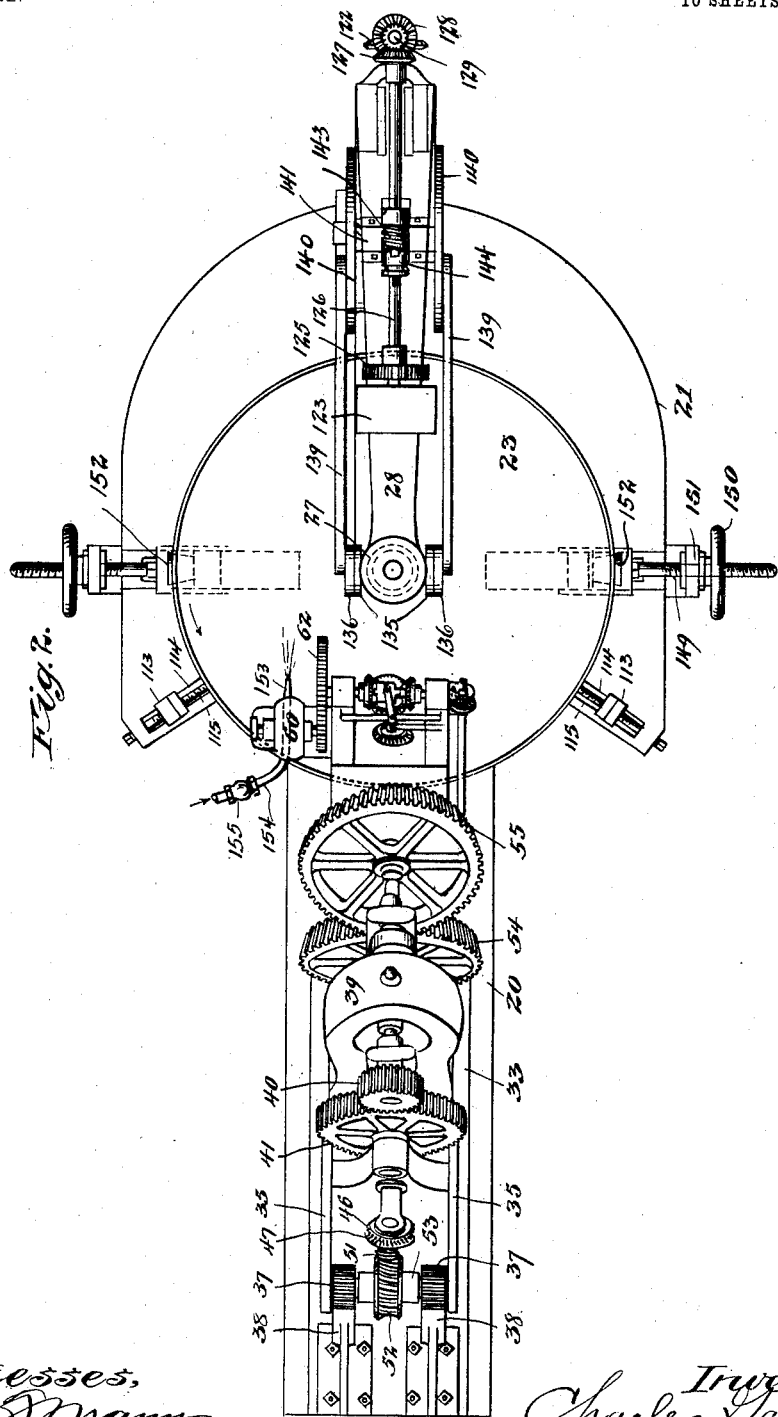
Figure 3:
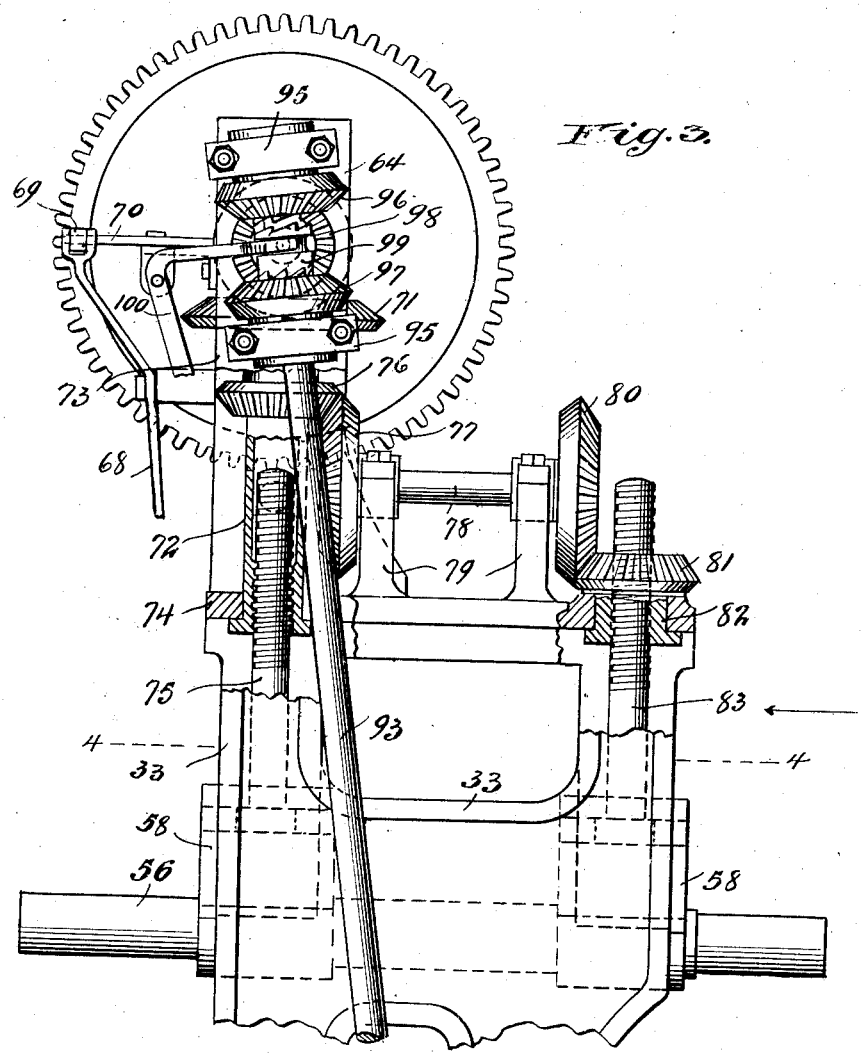
Figure 4:
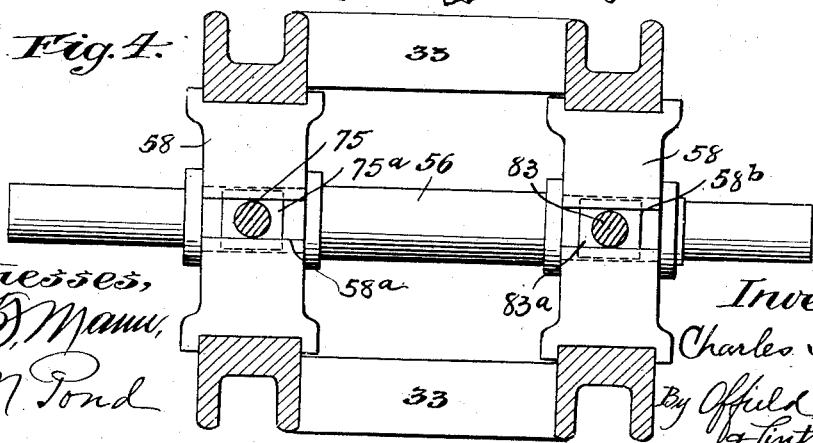
Figure 5:
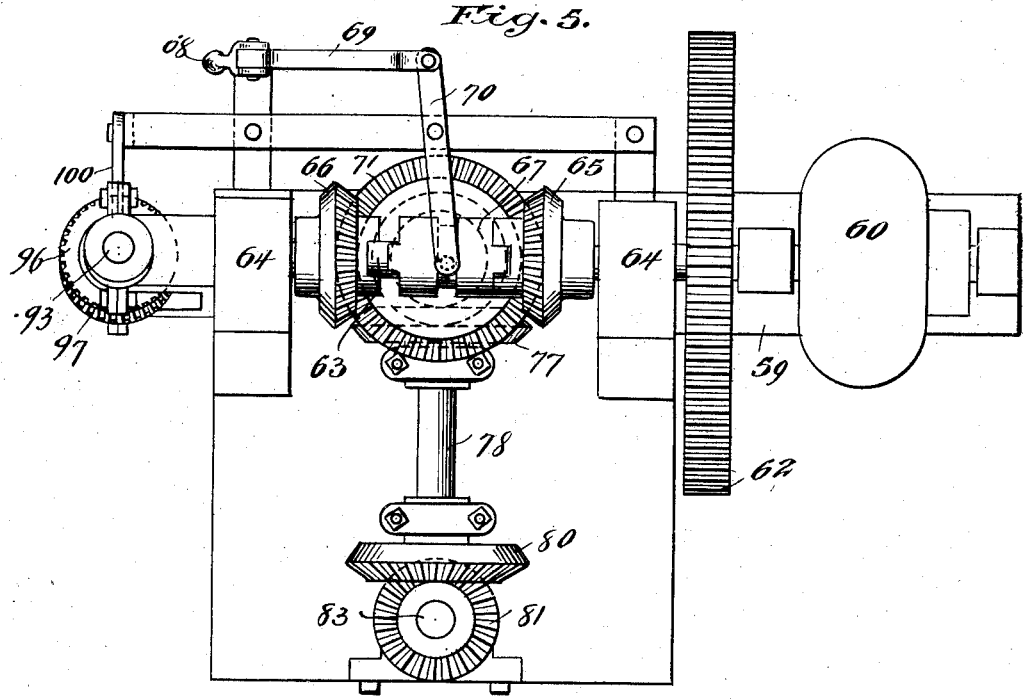
Figure 10:
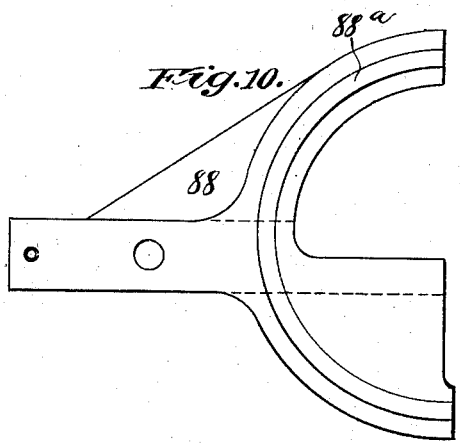

Figure 1 is a side elevation of the complete machine, showing the same in the working position assumed thereby when just completing the dishing and flanging of a metal disk into the form of a boiler-head. Fig. 2 is a top plan view of the machine as shown in Fig. 1. Fig. 3 is an enlarged detail view, partly in section, of the upper end or head of the roll-carrying frame carrying the roll actuating and reversing devices. Fig. 4 is a horizontal section on the line 4 4 of Fig. 3. Fig. 5 is a top plan view of the parts shown in Fig. 3. Fig. 6 is a front elevational view of the parts shown in Fig. 3. Fig. 7 is an enlarged detail view illustrating the adjustable pivotal connection of the tilting roll-carrying frame with its inner support and also showing in part the mechanism for actuating the angularly-movable flanging-roll. Fig. 8 is a top plan view of the parts and mechanism shown in Fig. 7. Fig. 9 is a front elevational view of the parts and mechanism shown in Fig. 7. Fig. 10 is a detail view, in side elevation, enlarged, of a stationary frame-plate constituting one of the side mountings of a quadrant-frame carrying the angularly-movable flanging-roll. Fig. 11 is a detail view, in side elevation, of one of the radially-movable idler-supports for the disk or head to be flanged. Figs. 12, 13, and 14 are top plan, side elevational, and vertical sectional views, respectively, illustrating the central supporting and clamping mechanism for the disk to be flanged and in part the mechanism for centering the same. Fig. 15 is a detail vertical sectional view through the lower end of the radius-arm of the dishing-roll, showing the manner of mounting the latter. Figs. 16 and 17 are top plan and front elevational views, respectively, of the mechanism for mounting the idler-rolls on either side of the main flanging-rolls and maintaining them radial to the disk when the mechanism is adjusted to accommodate disks of varying diameters. Figs. 18 and 18ª are side and front elevational views, respectively, of the idler-rolls last referred to, illustrating more fully the angularly-adjustable frames on which they are mounted; and Figs. 19 and 19ª are respectively top plan and side elevational views of the transverse yoke in which the frames carrying said last-named idler-rolls are pivotally mounted with capacity for oscillation around vertical axes.

My complete machine comprises in general two groups of devices, which are preferably disposed opposite each other upon the bed-plate of the machine, one group comprising the flanging mechanism and the opposite group comprising the dishing mechanism. Ancillary to said principal mechanisms are other devices, including means for accurately centering the disk prior to the rolling operation, means for clamping and holding it in such centered position, and auxiliary devices coöperating with the main dishing mechanism to secure the rounding or dishing of the head in a perfectly uniform manner during the flanging operation.

Referring more specifically to the drawings, 20 designates a bed-plate on which the superstructure of the machine is mounted. On the right-hand end of this bed-plate, as shown in Figs. 1 and 2, is mounted in ways 20ª a slidable support 21ª for a low platform 21, centrally of the inner end of which latter is rotatably mounted on ball-bearings a pivot-plate 22, Fig. 14, constituting the lower member of a clamp designed to seat and firmly hold the metal disk-shaped plate 23 during the operation of the machine thereupon. A companion pivot-plate 24 is similarly mounted in the lower end of a vertically-movable plunger rod or stem 25, this latter having at its upper end the piston or plunger head 26, Fig. 1, operating in a cylinder 27, rigidly held on the inner end of an inwardly-extending beam 28, overlying the platform 21 and integral with and carried by the movable platform-support 21ª. The plunger-rod 25 is lowered and raised at the desired times to clamp and release the plate 23 by means of a pressure fluid, preferably compressed air, alternately admitted to the upper and lower ends of cylinder 27 through pipes 29 and 30, alternately supplied from a pipe 31 by means of an interposed ordinary four-way cock 32, it being understood that while air is supplied through one of the pipes 29 30 it is simultaneously exhausted through the other.

Referring next to the mechanism for effecting the flanging operation upon the plate 23 after the latter has been received and clamped between the plates or heads 22 and 24, 33 designates as an entirety a suitably-framed structure equipped with variously-disposed pillow-blocks and journal-bearings to receive the driving mechanism of the flanging-roll, hereinafter more particularly described, and further provided at its inner and outer ends with rigid longitudinal extensions 34 and 35, the former of which is provided with a series of transverse holes by means of which it may be pivoted in any one of a corresponding series of transverse holes formed through the upper end of a pillow-block 36, mounted on the bed-plate 20, substantially centrally thereof, and the latter of which has journaled in its outer end a pair of pinions 37, which engage a pair of fixed segmental racks 38, rising from the left-hand end of the bed-plate 20.

Suitably mounted in the upper portion of the pivoted frame 33 is a main motor, herein indicated as an electric motor 39, the armature-shaft of which drives, through pinion 40, gear 41, pinion 42, and gear 43, a main power-shaft 44, journaled in and longitudinally of the frame 33 and extending the entire length of said frame. Shaft 44 carries at its outer end a bevel-pinion 45, which meshes with a pair of bevel-pinions 46 and 47, loosely mounted on a short counter-shaft 48, journaled in a U frame or bracket 49, projecting from the rear or outer end of the main frame 33. Splined on the shaft 48, between the pinions 46 and 47, is a double-faced clutch 50, through the manipulation of which the shaft may be driven in either direction by the rotation of the pinion 45 in an obvious manner. On the lower end of the shaft 48 is a worm 51, which meshes with a worm-wheel 52, fast on a shaft 53, mounted in and between the parallel arms of the extension 35, said shaft 53 also having fast thereon the pinions 37 already referred to. The motor 39 will thus through the described connections automatically raise or lower the outer end of the frame accordingly as the clutch 50 coöperates with one or the other of the pinions 46 or 47, while when the clutch is in an intermediate position the frame will remain stationary in any given position, owing to the fact that the driving-worm 51 constitute at all times a lock against the tendency of gravity to lower the frame.

Fast on the shaft 44 inwardly of the spur-gear 43 is a large bevel-gear 54, which meshes with a superposed companion bevel-gear 55 fast on the inner end of a roll-shaft 56, said shaft carrying on its opposite end the flanging-roll 57. This latter consists of a thick solid metal disk, the periphery of which has a double-beveled face, the inner of which in coöperation with an underlying roll, hereinafter described, creates and determines the flange in the rolling operation. Referring to Figs. 3 and 4, it will be seen that the shaft 56 is journaled in a pair of blocks 58, which are slidable in suitable ways formed in the machine-frame in a direction transverse to the shaft. These blocks 58 are simultaneously raised and lowered through mechanism next to be described, whereby the bevel-gears 54 and 55 are carried out of and into mesh at the same time that the roll 57 is withdrawn from and introduced to its operative position.

Referring to Figs. 3, 4, 5, and 6, 59 designates a bracket extending horizontally from one of the upright members of the pivoted frame 33 and carrying an auxiliary motor 60, the armature-shaft of which has a pinion 61, intermeshing a large spur-gear 62 on the overhanging end of a horizontal shaft 63, journaled in a pair of uprights 64, superposed upon the inner section of the main frame 33. The shaft 63 has loose thereon a pair of oppositely-disposed bevel-pinions 65 and 66, either of which may be made fast with the shaft through the agency of a splined double-faced clutch 67, located between them and operated from a shifting-lever 68 through a link 69 and forked lever 70. Both pinions 65 and 66 mesh with a bevel-gear 71, disposed therebeneath fast on the upper end of a tubular shaft 72, mounted in journal-bearings formed in a pair of cross-pieces 73 and 74. As shown in Fig. 3, the lower end of the tubular shaft 72 is internally threaded to engage the upper threaded end of a headed bolt 75, said bolt having its lower rectangular-headed end 75$^a$ confined in a slideway 58$^a$, formed in the upper face of the outer bearing-block 58. Fast on the tubular shaft 72 below the bevel-gear 71 is an oppositely-faced bevel-pinion 76, which meshes with a bevel-gear 77, fast on the adjacent end of a counter-shaft 78, journaled in standards 79, mounted on top of the inner portion of the main frame 33. The shaft 78 has fast on its opposite end an oppositely-faced bevel-gear 80, which intermeshes a bevel-pinion 81, provided with a short internally-threaded depending sleeve 82, which is journaled in the upper transverse member of the inner section of the main frame 33. The sleeve 82 is entered by the upper threaded end of a bolt 83, constituting a companion to the bolt 75 and having a rectangular head 83$^a$, confined within a slideway 58$^b$, formed in the upper face of the inner bearing-block 58. From the foregoing it will be seen that the motor 60 will through the described connections impart a simultaneous rotation in the same direction to the tubular shaft 72 and the sleeve 82, thereby simultaneously raising or lowering the rods or bolts 75 and 83 and through the latter the bearing-blocks 58 and the shaft 56 and parts carried thereby, according as the clutch 67 is thrown to engage one or the other of the bevel-pinions 65 and 66.

Fast on the inner end of the main shaft 44 is a narrow roll 84, the periphery of this roll being beveled to mate and register with the foremost bevel of the roll 57, whereby said rolls 84 and 57 clamp between them the plate 23 just inside the base of the flange of the latter, and the bite of these two rolls upon the plate produces a rotation of the latter around its central bearing between the heads 22 and 24, as will hereinafter more fully appear in connection with the description of the operation of the machine.

Behind the main flanging-roll 57 is located an auxiliary flanging-roll 85. This roll is an idler, being rotated solely by the frictional contact of the under or outer surface of the marginal portion of the plate therewith, but is carried by a mechanism which during the rolling and flanging operation imparts thereto a bodily angular movement, serving, in cooperation with the roll 57, to bend and shape up the marginal portion of the plate into the form of a flange. Referring to Figs. 7, 8, 9, and 10, it will be seen that the roll 85 is mounted to rotate on a spindle 86, carried in a quadrant-shaped frame 87, the curved face of which is provided with a pair of segment-racks 87$^a$. The opposite side walls of the frame 87 are equipped with arc-shaped grooves 87$^b$, Fig. 9, which are engaged by corresponding feathers or ribs 88$^a$, Fig. 10, formed on the inner faces of a pair of stationary frame-plates 88, themselves secured to the opposed inner walls of the inner section of the main tilting frame 33. Journaled in the latter directly in rear of the segment-frame 87 is a transverse horizontal shaft 89, which shaft has fast thereon a pair of pinions 90, meshing with the segmental racks 87$^a$, and at its outer overhanging end rests in bearings in a laterally-extending bracket 91 and carries a worm-gear 92, fast thereon, Fig. 8. The bracket 91 also affords journal-bearings for the lower end of an inclined shaft 93, the latter having fast on its lower end a worm 94, meshing with and driving the worm-gear 92, and at its upper end journaled in a laterally-extending bracket 95, Figs. 3 and 6, secured to the outer face of the standard 64. The upper end of the shaft 93 has loose thereon within the bracket 95 a pair of bevel-pinions 96 and 97, both of which mesh with a bevel-pinion 98, fast on the adjacent end of the transverse shaft 63, already described. Splined on the shaft 93, between the pinions 96 and 97, is a double-faced clutch 99, adapted to be thrown by a suitably-pivoted shifting-lever 100. From the described connections it will be seen that the auxiliary motor 60 not only serves to raise and lower the roll-shaft 56 at the desired times, but also effects a slow rotation of the pinions 90, whereby the frame 87 is gradually raised and lowered on its ways, thereby effecting a bodily angular tilting of the roll 85 from a horizontal to a vertical position, and vice versa, according as the clutch 99 is engaged with one or the other of the pinions 96 and 97.

Referring to Figs. 1, 7, and 16 to 19$^a$, inclusive, 101 designates a pair of idler-rolls disposed directly beneath the main flanging-roll 57, on either side thereof, and normally overridden by the under surface of the plate 23. These rolls 101 are designed to assist and coöperate with the centrally-underlying main supporting-roll 84 in forming a suitable antifriction rest or support for the marginal portion of the disk in immediate proximity to the flanging-rolls 57 and 85, whereby the latter rolls are enabled to effectively perform their work upon the disk. These idler-rolls 101 are supported with their axes of rotation coincident with the radii of the disk; but by reason of the fact that the rolls are mounted a fixed distance apart on the inner end of the main frame 33, as shown by reference to Figs. 16 and 17, it is necessary to provide means whereby the axial direction thereof may be maintained coincident with the radii of the disk when the machine is adjusted, as hereinafter described, to operate upon disks of varying diameters. For this purpose the following mechanism has been found to operate satisfactorily and in an automatic manner. Each roll is rotatably journaled upon a short spindle 102, securely held in the vertical member of an L-shaped bracket 103, the horizontal member of which is bifurcated, as shown in Fig. 18ª, and straddles and is secured to a longitudinal fin 104 on a bearing-sleeve 105, from the bottom portion of which depends a shaft 106, externally threaded for the reception of a nut 107. The roller-supports thus constituted are respectively journaled vertically in the bearings 108, formed in the ends of a transverse yoke 109, which is itself rotatably supported by its journals 109ª in a pair of bearings 110, Fig. 7, formed in the opposed twin walls of the inner section of the main tilting frame. The bearing-sleeves 105 of the roller-carrying brackets are respectively mounted slidingly upon radial guide-bars 111, which guide-bars are at their inner ends joined, with capacity for universal pivotal movement, to a sleeve 112, positioned and supported as hereinafter described, with its axis coincident with the vertical axis of rotation of the disk 23. By reason of this mechanism any inward or outward bodily movement of the idler-rolls 101 is necessarily accompanied by such a horizontal angular movement thereof, afforded by the vertical journals of their supporting-brackets, as maintains the axes of said rolls always coincident with the radii of the disk, while the horizontal journaling of their carrying-yoke 109 permits angular variations of the rolls 101 in a vertical plane to accommodate the particular degree of inclination from the horizontal that may be presented by the radius of the overlying disk.

It is essential when introducing the flat circular plate to the action of the machine that means be provided for accurately centering same prior to the rolling operation. Such means are shown in Figs. 1 and 2 in the form of a series (here shown as three) of stops mounted on the platform 21 and grouped around the plate substantially one hundred and twenty degrees apart and at equal radial distances from the central point of the supporting-plate 22. The two inner stops are designated by 113 and are in the form of blocks mounted in ways 114, formed in and radially of the platform, in or beneath which ways are suitably journaled screw-threaded shafts 115, which engage the lower portions of the blocks, said shafts at their inner ends being provided with pinions 116, Fig. 12, adapted to engage a bevel-gear 117, rotatably mounted on a vertical shaft 118, which is rigidly secured at its lower end in a bracket 119 and is positioned below and in axial alinement with the plunger-stem 25. The bevel-gear 117 is driven by a bevel-pinion 120 on the inner end of a horizontal shaft 121, rotatably mounted in a third radial way in the platform and provided on its outer end with a bevel-gear 122, conveniently driven from a second auxiliary motor 123 through a pinion 124 on the armature-shaft meshing with a gear 125 on the adjacent end of a horizontal shaft 126, mounted in suitable bearings above the beam 28, said shaft 126 driving, through bevel-pinions 127 and 128, a vertical shaft 129, the lower end of which is provided with a pair of loosely-mounted pinions 130 and 131, engaging the bevel-gear 122, said last-named pinions being rendered operative to actuate the shaft 121 in either direction, as desired, by means of a friction-clutch 132, splined on the shaft 129. The shaft 121, like its companion shafts 115, is screw-threaded throughout a portion of its length and engages and actuates the third stop-block 133, Fig. 1, this latter block having rotatably mounted in the upper end of its upright plate contacting member a conical roll 134, having a function hereinafter disclosed in the description of the operation of the machine.

The machine as thus far described is complete for the purpose of simply flanging a flat circular disk, and its operation may be briefly described as follows: The stops 113 and 133 having been run outwardly by the auxiliary motor 123, the heated disk from the oven is introduced onto the platform 21, being roughly centered above the supporting-plate 22 by the attendants with their tongs. On then driving the motor 123 in the reverse direction the three stops are caused to approach the periphery of the disk, and being all equidistant from the center of the supporting-plate 22 it follows that when they all three contact the periphery of the disk the latter is accurately centered. The friction-clutch 132 will slip and yield when the centering of the plate is complete, thus preventing undue strains upon the motor and driving connections after the travel of the stops has ceased by contact with the disks. Immediately upon the centering of the disk the air-cock 32 is manipulated to lower the plunger-stem 25 and securely clamp and hold the disk between the clamping-plates 22 and 24, Fig. 14. Meanwhile the main frame 33 of the flanging mechanism is in its lowered position, resting upon the base-plate 20, which position it retains throughout the flanging operation, the clutch 50 being thrown to intermediate position, in which it engages neither of the bevel-pinions 46 and 47. The roll-shaft 56 is equipped with a flanging-roll 57, provided with bevel-faces having such an angular relation that when the roll is in operative position upon the shaft, with the frame 33 resting on the base-plate, the inner bevel-face of the roll at its lowermost point will be vertical, while the outer face of the roll at its lowest point will be horizontal. At the same time the upper surfaces of the flanging-roll 85, the clamping or biting roll 84, and the idler-rolls 101 will all be lying in the same horizontal plane, in which they will contact the under surface of the marginal portion of the centered disk. During the introduction and centering of the disk the flanging-roll 57 and its driving-gear 55 and driving-shaft 56 have been in elevated position to permit the introduction of the margin of the disk between the roll 57 and the other underlying rolls. When the disk is ready to be flanged, however, the roll 57 and its operating means are lowered into operative position by the auxiliary motor 60 through a proper manipulation of the shifting-lever 68, and as soon as the driving-gears 54 and 55 have thus been brought into engagement the main motor 39 is started up, thus driving the rolls 57 and 84, which through their bite upon the disk produce a rapid rotation of the latter about its central support. Simultaneously with this operation of the rolls 57 and 84 the shifting-lever 100 is actuated to set into operation the driving mechanism of the shaft 89, through the slow rotation of which the quadrant-frame 87, carrying the roll 85, is gradually elevated, thereby turning the roll 85 in contact with the marginal portion of the disk by a slow uniform movement from a horizontal to a vertical position, during which movement it coöperates with the inner beveled face of the flanging-roll 57, forming up the vertical flange of the disk. As soon as the flanging of the disk is completed the operation of the main motor 39 is stopped, the shifting-levers 68 and 100 are reversed, and the auxiliary motor 60 elevates the flanging-roll 57 out of the way, while at the same time the coöperating idler flanging-roll 85 is lowered to horizontal position ready for operation on the next disk. For many purposes it is desirable to not only flange the disk, but also to dish the same, and this latter operation may be performed simultaneously with the flanging operation through the mechanism next to be described.

Upon the inner end of the beam 28 is mounted a pair of standards 135, provided with a series of pivot-holes 135$^a$, formed therethrough throughout a part or the entire extent thereof. Pivoted to said standards are a pair of arms 136, provided with a similar series of pivot-holes 136$^a$ and connected at their lower ends by a frame 137, Fig. 15, having end spindles 137$^a$, whereby said frame is journaled in and between said arms, said frame itself constituting a housing for a roll 138 journaled therein in such a manner that the plane of the roll coincides or is parallel with the plane of the arms 136. This roll is actuated by a pair of pitmen 139, pivoted at their lower ends on the spindles 137$^a$ of the roller-frame and at their upper ends pivoted in one of a series of apertures 140$^a$, formed at varying radial distances through driving-disks 140, fast on the overhanging ends of a shaft 141, journaled transversely of and above the beam 28 and having fast thereon a worm-wheel 142, driven by a worm 143, loosely mounted on the shaft 126, but capable of being made fast therewith through a sliding clutch 144, actuated by a hand-lever 145 and connecting-link 146. Through the connections last described the arms 136 are oscillated, carrying the roll 138 back and forth through the arc of a circle which is substantially coextensive with the radial distance of that portion of the plate operated upon lying between its central clamped portion and the base of the peripheral flange. In order that this movement of the roll 138 may be effective to create the desired dishing of the plate, it is essential that means be provided for forcing up and supporting the outer portion of the plate lying below and inwardly of the flange. The means herein shown for initially effecting this result consist of a pair of oppositely-positioned wedge-blocks 147, Fig. 11, mounted to slide on ways 148, arranged radially of the platform 21 and provided with manual operating means comprising a threaded rod 149, passed through the internally-threaded hub of a hand-wheel 150, mounted to turn in a bracket 151. In order to avoid undue friction between the disk and the wedge-blocks after the latter have been forced to a considerable extent beneath the margin of the disk, the blocks are equipped in their rear and more elevated portions with conical idler-rolls 152. These wedge-blocks in coöperation with the flanging-rolls themselves (which are gradually elevated during the flanging operation when forming up a dished head) serve to gradually elevate the outer portion of the disk at three out of four points ninety degrees apart thereon. It is desirable that means be provided for similarly elevating and supporting the outer margin of the plate at a point diametrically opposite the flanging-rolls, and for this purpose there is provided the additional conical idler-roll 134, Fig. 1, already referred to as mounted upon the stop-block 133.

Where a disk is to be not only flanged but also dished by the above-described mechanism, the operation is substantially as follows: A suitably-beveled flanging-roll 57 having been applied to the shaft 56, the disk is centered, clamped, and introduced to the bite of the actuating and flanging rolls in the manner already described in connection with the flanging operation. As soon as the flanging operation has been fairly started in the manner already described the clutch 50 is actuated in a direction to effect the slow rotation of the pinions 37 in and upwardly of the racks 38, thereby gradually elevating the main frame 33 about its inner pivotal point between the pillow-blocks 36. This operation obviously produces a combined upward bodily movement of the flanging-rolls in addition to and simultaneously with a slight variation of their axial angular positions relatively to the fixed center of the rotating disk. By reason thereof simultaneously with the formation of the flange the entire outer or marginal portion of the disk is gradually elevated above its central fixed point, thereby obviously giving a concavo-convex form to the entire body portion of the disk. Simultaneously with the described elevation of the frame 33 and the mechanism carried thereby the manually-operated wedge-blocks 147 are gradually forced beneath the margins of the disk, and at or about the same time the stop-block 133, carrying the conical roll 134, is also forced beneath the margin of the disk through the operation of the auxiliary motor 123. While these operations are going on, the lever 145 is suitably actuated to bring into operation the actuating mechanism of the dishing-roll 138, the uniform back-and-forth reciprocations of said roll over the upper surface of the rotating disk producing a uniform and well-rounded dished effect upon the latter. In practice the best results are obtained by delaying the inception of the work of the dishing-roll until after the main frame 33 has nearly or quite reached the extreme of its angular movement and the auxiliary supporting idler-rolls 152 and 134 have been partially introduced beneath the margin of the disk, the function of the latter and the actuating and flanging rolls being to upset the margin of the disk relatively to its center, and the function of the roll 138 being to produce a uniform and well-rounded convex or dished effect upon the entire portion of the disk embraced by the marginal flange. In practice I find it desirable to subject the upper surface of the disk during the dishing and flanging operations to a blast of steam or compressed air to blow off and out of the way of the dishing-roll such scale as may tend to form on the surface of the disk as it cools. This jet may be conveniently introduced through a suitably-directed nozzle 153, connected with an inlet-pipe 154, controlled by a valve 155.

In order that the machine may operate upon disks of varying diameters, it is of course essential to provide means for varying the radial distance between the central clamp or holder and the flanging-rolls. This is conveniently accomplished by an adjustment of the entire platform-support and its superposed parts along the ways 20ª toward and from the flanging-rolls. This adjustment may be performed through a variety of devices; but a simple means for this purpose consists of a stationary rack 156, formed on the bed-plate 20 alongside of and parallel with the ways 20ª, said rack being engaged by a spur-pinion 157, mounted on the overhanging end of a shaft 158, journaled in and transversely of the platform-support 21ª, which shaft may be provided on its opposite end with a hand-wheel or a crank (not shown) or may be equipped with power connections to any one of the elements actuated by the motor 123. In order to secure the sliding frame in any adjusted position on the bed-plate, the latter may be provided with a series of vertical apertures 159, adapted to be entered by bolts 160, carried by the base of the sliding frame when the latter has been moved into its desired position.

The mechanism last described qualifies the machine for handling disks of various diameters. In order that the machine may at the same time be qualified to produce heads of varying depths and character of convexity, it is necessary to vary the height to which the marginal portion of the disk is raised relatively to its fixed central portion during the dishing and flanging operation and also to vary the length and radius of the arc represented by the sweep of the dishing-roll. The former is readily accomplished by simply changing the point of pivotal connection of the inner extension 34 of the main frame 33 in and between the pillow-blocks 36, for which purpose the parts last named are provided, as already described, with companion series of pivotal apertures, the corresponding apertures of the two series being located at graduated vertical distances apart. The variations in the length of sweep of the dishing-roll to accommodate disks of varying diameters are determined by the pivotal connection of the pitmen 139 on the crank-disks 140 in an obvious manner, while the variations in the degree or character of convexity given to the disk are determined by the pivotal relation of the arms 136 in the standards 135. Obviously when these parts are pivotally united at their upper ends, as shown in the drawings, the degree of convexity imparted to the disk is shallowest, while when the said parts are pivoted through the lowermost of their corresponding pivotal apertures the degree of convexity imparted by the dishing-roll is deepest or sharpest, and intermediate degrees of convexity are secured by pivotally uniting the arms on their standards at various points between the highest and lowest pivotal points.

It will thus be seen that my present invention provides a machine capable not only of operating upon disks of widely-varying sizes and of either flanging the disks alone or both flanging and dishing them, but it is also capable of imparting to the disks a convexed or dished effect of practically any desired character or degree.

While the machine herein shown and described is designed to form on the disk a flange parallel with the axis thereof, yet it is quite evident that by giving to the driving flanging-roll 57 beveled faces of different angular pitch and to the idler flanging-roll 85 a greater or less angular movement flanges might be formed on the disk having any desired angular relation to the body thereof.

It is obvious that the underlying principle of my invention might be embodied in a machine varying considerably in details from the machine herein shown and described. I do not, therefore, limit my invention to the particular mechanical embodiment thereof herein described and illustrated.

I claim—

1. In a flanging-machine, the combination with a rotatable support for a disk, of a pair of flanging-rolls suitably mounted to receive between them the marginal portion of the disk, means for imparting to one of said flanging-rolls an angular movement toward the other during the flanging operation, and a pair of gripping-rolls serving to effect the rotation of the disk, substantially as described.

2. In a flanging-machine, the combination with a rotatable support for a disk, of a double-beveled gripping and flanging roll suitably mounted to engage the marginal portion of the disk on one surface thereof, a gripping-roll engaging the other surface of the disk and coöperating with the gripping-face of said gripping and flanging roll to effect the rotation of the disk, an idler flanging-roll engaging said other surface of the disk and coöperating with the flanging-face of said gripping and flanging roll, and means for imparting to said idler flanging-roll an angular movement during the rolling and flanging operation, substantially as described.

3. In a flanging-machine, the combination with a rotatable support for a disk, of a double-beveled gripping and flanging roll suitably mounted to engage the marginal portion of the disk on one surface thereof, a gripping-roll engaging the other surface of the disk and coöperating with the gripping-face of said gripping and flanging roll to effect the rotation of the disk, an idler flanging-roll engaging said other surface of the disk and coöperating with the flanging-face of said gripping and flanging roll, means for imparting to said idler flanging-roll an angular movement during the rolling and flanging operation, and idler-rolls engaging and supporting the surface of the disk on either side of said gripping-roll, substantially as described.

4. In a flanging-machine, the combination with a rotatable support for a disk, of a double-beveled gripping and flanging roll suitably mounted to engage the marginal portion of the disk on one surface thereof, a gripping-roll engaging the other surface of the disk and coöperating with the gripping-face of said gripping and flanging roll to effect the rotation of the disk, an idler flanging-roll engaging said other surface of the disk and coöperating with the flanging-face of said gripping and flanging roll, means for imparting to said idler flanging-roll an angular movement during the rolling and flanging operation, and means for separating said gripping and flanging roll and said gripping-roll for the insertion and removal of the disk, substantially as described.

5. In a flanging-machine, the combination with a rotatable support for a disk, of a double-beveled gripping and flanging roll suitably mounted to engage the upper marginal portion of the disk, a gripping-roll engaging the under surface of the disk and coöperating with the gripping-face of said gripping and flanging roll to effect the rotation of the disk, an idler flanging-roll engaging the under marginal surface of the disk and coöperating with the flanging-face of said gripping and flanging roll, means for imparting to said idler flanging-roll an angular movement during the rolling and flanging operation, and means for bodily raising and lowering said gripping and flanging roll for the insertion and removal of the disk, substantially as described.

6. In a dishing and flanging machine, the combination with a rotatable support for a disk, of a pair of flanging-rolls suitably mounted to receive between them the marginal portion of the disk, and means for imparting to said flanging-rolls a combined bodily movement and angular movement relatively to each other during the dishing and flanging operation, substantially as described.

7. In a dishing and flanging machine, the combination with a rotatable support for a disk, and means for clamping the latter centrally upon said support, of a pair of flanging-rolls suitably mounted to receive between them the marginal portion of the disk, and means for imparting to said flanging-rolls a combined bodily movement and angular movement relatively to each other during the dishing and flanging operation, substantially as described.

8. In a dishing and flanging machine, the combination with a rotatable support for a disk, of a pair of flanging-rolls suitably mounted to receive between them the marginal portion of the disk, means for imparting to said flanging-rolls a combined bodily upward and angular movement during the dishing and flanging operation, and idler-rolls engaging and supporting the under surface of the disk on either side of said flanging-rolls, substantially as described.

9. In a dishing and flanging machine, the combination with a rotatable support for a disk, of a pivoted frame vertically movable in radial alinement with the disk, a pair of flanging-rolls mounted in said frame and adapted to receive between them the marginal portion of the disk, and means for elevating and lowering the free or outer end of said frame whereby to effect a combined bodily upward and angular movement of said flanging-rolls, substantially as described.

10. In a dishing and flanging machine, the combination with a rotatable support for a disk, of a pivoted frame vertically movable in radial alinement with the disk, a pair of flanging-rolls mounted in said frame and adapted to receive between them the marginal portion of the disk, means for elevating and lowering the free or outer end of said frame whereby to effect a combined bodily upward and angular movement of said flanging-rolls, and means for independently effecting an angular movement of one of said flanging-rolls toward the other, substantially as described.

11. In a dishing and flanging machine, the combination with a rotatable support for a disk, of a pivoted frame vertically movable in radial alinement with the disk, a positively-driven flanging-roll and an idler flanging-roll both mounted in said frame and adapted to receive between them the marginal portion of the disk, means carried by said frame for elevating and lowering its free or outer end and for driving said positively-driven flanging-roll, and independent means also carried by said frame for independently effecting an angular movement of said idler flanging-roll toward the positively-driven roll, substantially as described.

12. In a dishing and flanging machine, the combination with a rotatable support for a disk, of a pivoted frame vertically movable in radial alinement with the disk, a pair of flanging-rolls mounted in said frame and adapted to receive between them the marginal portion of the disk, means for elevating and lowering the free or outer end of said frame, means for independently effecting a relative angular movement of said flanging-rolls toward each other, and means for adjusting the distance between said rotatable support and said flanging-rolls, substantially as described.

13. In a dishing and flanging machine, the combination with a rotatable support for a disk, of a pivoted frame vertically movable in radial alinement with the disk, a pair of flanging-rolls mounted in said frame and adapted to receive between them the marginal portion of the disk, means for elevating and lowering the free or outer end of said frame, means for independently effecting an angular movement of one of said flanging-rolls toward the other, idler supporting-rolls mounted in said frame on either side of said flanging-rolls, means for adjusting the distance between said rotatable support and said flanging-rolls, and means for maintaining the axes of said idler supporting-rolls always in alinement with radii of the disk, substantially as described.

14. In a dishing and flanging machine, the combination with a rotatable support for a disk, of a pivoted frame vertically movable in radial alinement with the disk, a stationary upright rack in rear of said frame, a pinion mounted in said frame and engaging said rack, driven and idler flanging-rolls mounted in the inner end of said frame and adapted to receive between them the marginal portion of the disk, a main motor mounted on said frame, driving connections therefrom to said pinion and to said driven flanging-roll, and an auxiliary motor likewise mounted on said frame serving to impart an angular movement of said idler flanging-roll toward said driven flanging-roll, substantially as described.

15. In a dishing and flanging machine, the combination with a rotatable central support and clamp for a disk, of a pair of flanging-rolls suitably mounted to receive between them the marginal portion of the disk, and independently-mounted endwise-movable idler-rolls supporting the under surface of the disk at intervals about its periphery, substantially as described.

16. In a dishing and flanging machine, the combination with a rotatable central support and clamp for a disk, of a pair of flanging-rolls suitably mounted to receive between them the marginal portion of the disk, idler-rolls engaging and supporting the under surface of the disk on either side of and closely adjacent said flanging-rolls, and other endwise-movable idler-rolls supporting the under surface of the disk at intervals about its periphery, substantially as described.

17. In a dishing and flanging machine, the combination with a rotatable support and clamp for a disk, of a pair of flanging-rolls suitably mounted to receive between them the marginal portion of the disk, means for effecting the rotation of the disk, a dishing-roll, and means for supporting and actuating the latter over the surface of the disk in an arc of travel extending radially of the disk, substantially as described.

18. In a dishing and flanging machine, the combination with a rotatable support and clamp for a disk, of a pair of flanging-rolls suitably mounted to receive between them the marginal portion of the disk, means for effecting the rotation of the disk, a dishing-roll, means for supporting and actuating the latter over the surface of the disk in an arc of travel extending radially of the disk, and means for varying the length of said arc of travel according to the diameter of the disk, substantially as described.

19. In a dishing and flanging machine, the combination with a rotatable support and clamp for a disk, of a pair of flanging-rolls suitably mounted to receive between them the marginal portion of the disk, means for effecting the rotation of the disk, a dishing-roll, means for supporting and actuating the latter over the surface of the disk in an arc of travel extending radially of the disk, and means for varying the radius of said arc of travel according to the degree of convexity to be imparted to the disk, substantially as described.

20. In a dishing and flanging machine, the combination with a rotatable support and clamp for a disk, of a pair of flanging-rolls suitably mounted to receive between them the marginal portion of the disk, means for effecting the rotation of the disk, a dishing-roll, means for supporting and actuating the latter over the surface of the disk in an arc of travel extending radially of the disk, means for varying the length of said arc of travel according to the diameter of the disk operated upon, and means for varying the radius of said arc of travel according to the degree of convexity to be imparted to the disk, substantially as described.

CHARLES GABRIEL.

Witnesses:
SAMUEL N. POND,
FREDERICK C. GOODWIN.